US006147180A

United States Patent [19]
Markel et al.

[11] Patent Number: 6,147,180
[45] Date of Patent: *Nov. 14, 2000

[54] THERMOPLASTIC ELASTOMER COMPOSITIONS FROM BRANCHED OLEFIN COPOLYMERS

[75] Inventors: Eric J. Markel, Kingwood; Weiqing Weng, Houston; Armen H. Dekmezian, Kingwood; Andrew J. Peacock, Houston, all of Tex.

[73] Assignee: Exxon Chemical Patents Inc., Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 09/019,609

[22] Filed: Feb. 6, 1998

Related U.S. Application Data

[60] Provisional application No. 60/037,323, Feb. 7, 1997, provisional application No. 60/046,812, May 2, 1997, and provisional application No. 60/067,782, Dec. 10, 1997.

[51] Int. Cl.$^7$ .......................... C08F 210/02; C08F 210/06
[52] U.S. Cl. ......................... 526/352; 526/348; 526/351
[58] Field of Search .................................... 526/351, 352, 526/348

[56] References Cited

U.S. PATENT DOCUMENTS

| | | |
|---|---|---|
| 3,989,768 | 11/1976 | Milkovich et al. . |
| 4,752,597 | 6/1988 | Turner . |
| 4,923,833 | 5/1990 | Kioka et al. . |
| 4,999,403 | 3/1991 | Datta et al. . |
| 5,272,236 | 12/1993 | Lai et al. . |
| 5,391,629 | 2/1995 | Turner et al. . |
| 5,444,145 | 8/1995 | Brant et al. . |
| 5,475,075 | 12/1995 | Brant et al. . |

FOREIGN PATENT DOCUMENTS

| | | |
|---|---|---|
| 0 366 411 A2 | 5/1990 | European Pat. Off. . |
| 0 563 632 A1 | 10/1993 | European Pat. Off. . |
| 0 572 034 A2 | 12/1993 | European Pat. Off. . |
| 0 690 079 | 1/1996 | European Pat. Off. . |
| 0 727 446 A1 | 8/1996 | European Pat. Off. . |
| 0 791 626 A1 | 8/1997 | European Pat. Off. . |
| 4 337308 | 5/1991 | Japan . |
| 2 241 244 | 7/1994 | United Kingdom . |
| 87 03604 | 6/1987 | WIPO . |
| 94 07930 A1 | 4/1994 | WIPO . |
| 94 21700 A1 | 9/1994 | WIPO . |
| 94 25523 A1 | 11/1994 | WIPO . |
| 97 06201 | 2/1997 | WIPO . |

OTHER PUBLICATIONS

"Structure And Properties of Block Polymers And Multiphass Polymer Systems: An Overview of Present Status And Future Potential," Aggarwal, Sixth Biennial Manchester Polymer Symposium, UMIST, (1976).
"Graft Polymers With Macromonomers. I. Synthesis From Methacrylate–Terminated Polystyrene," Schulz, et al, J. of Applied Polymer Science, vol. 27, pp. 4773–4786, (1982).
"Graft Polymers With Macromonomers. II. Copolymerization Kinetics Of Methacrylate–Terminated Polystyrene And Predicted Graft Copolymer Structures," Schulz, et al, J. of Polymer Science: Polymer Chemistry Edition, vol. 22, pp. 1633–1652, (1984).
"Styrene/Isoprene Diblock Macromer Graft Copolymer: (Synthesis And Properties)," Schultz, et al, Ind. Eng. Chem. Prod. Res. Dev., Vol. 25, pp. 148–152 (1988).
"Graft Copolymer Compatibilizers For Blends Of Polypropylene And Ethylene–Propylene Copolymers," Lohse, et al, Macromolecules, vol. 24, pp. 561–566, (1991).
"Theromplastics Elastomer Categories: A Comparison Of Physical Properties, " Leggee, Elastomerics, vol. 123, No. 9, pp. 14–20 (1991).
"Relative Reactivities And Graft Distributions Of Polystyrene Macromers® In Vinyl Chloride Copolymerization," Schulz, et al, Polymer International, vol. 33, pp. 141–149, (1994).

Primary Examiner—David W. Wu
Assistant Examiner—Caixia Lu
Attorney, Agent, or Firm—William G Muller; Frank E. Reid

[57] ABSTRACT

The invention relates to a thermoplastic elastomer composition comprising a branched olefin copolymer derived from olefinically unsaturated monomers capable of insertion polymerization having A) a $T_g$ as measured by DSC less than or equal to 10° C.; B) $T_m$ greater than 80° C.; C) an elongation at break of greater than or equal to 300%; D) a tensile strength of greater than or equal to 1,500 psi (10,300 kPa); and E) an elastic recovery of greater than or equal to 50%. The invention also relates to process for preparing the invention composition comprising: A) polymerizing ethylene or propylene and optionally, one or more copolymerizable monomers in a polymerization reaction under conditions sufficient to form copolymer having greater than 40% chain end-group unsaturation; B) copolymerizing the product of A) with ethylene and one or more comonomers so as to prepare said branched olefin copolymer. The branched olefin copolymer compositions of the invention are suitable as replacements for styrene block copolymer compositions and in other traditional thermoplastic elastomer applications.

7 Claims, 1 Drawing Sheet

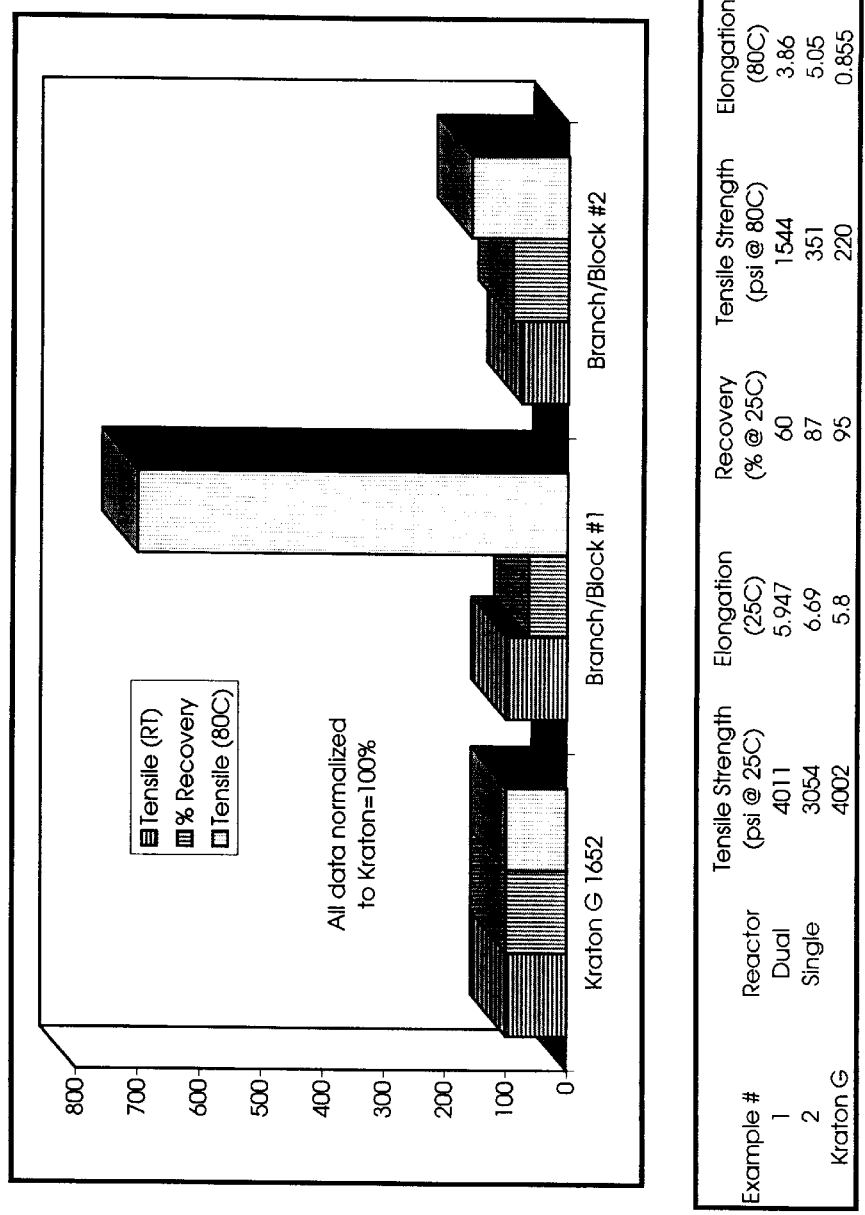

ND BRANCHED
THERMOPLASTIC ELASTOMER COMPOSITIONS FROM BRANCHED OLEFIN COPOLYMERS

This application is based on provisional applications U.S. Ser. No. 60/037323 filed Feb. 7, 1997, U.S. Ser. No. 60/046812 filed May 2, 1997, and U.S. Ser. No. 60/067,782 filed Dec. 10, 1997.

TECHNICAL FIELD

The invention relates to thermoplastic elastomer compositions comprised of branched olefin copolymers having crystallizable polyolefin sidechains incorporated into low crystallinity polyethylene backbones.

BACKGROUND ART

Triblock and multi-block copolymers are well-known in the art relating to elastomeric polymers useful as thermoplastic elastomer ("TPE") compositions due to the presence of "soft" (elastomeric) blocks connecting "hard" (crystallizable or glassy) blocks. The hard blocks bind the polymer network together at typical use temperatures. However, when heated above the melt temperature or glass transition temperature of the hard block, the polymer flows readily exhibiting thermoplastic behavior. See, for example, G. Holden and N. R. Legge, Thermoplastic Elastomers: A Comprehensive Review, Oxford University Press (1987).

The best commercially known class of TPE polymers are the styrenic block copolymers (SBC), typically linear triblock polymers such as styrene-isoprene-styrene and styrene-butadiene-styrene, the latter of which when hydrogenated become essentially styrene-(ethylene-butene)-styrene block copolymers. Radial and star branched SBC copolymers are also well-known. These copolymers typically are prepared by sequential anionic polymerization or by chemical coupling of linear diblock copolymers. The glass transition temperature ($T_g$) of the typical SBC TPE is equal to or less than about 80–90° C., thus presenting a limitation on the utility of these copolymers under higher temperature use conditions. See, "Structures and Properties of Block Polymers and Multiphase Polymer Systems: An Overview of Present Status and Future Potential", S. L. Aggarwal, Sixth Biennial Manchester Polymer Symposium (UMIST Manchester, March 1976)

Insertion, or coordination, polymerization of olefins can provide economically more efficient means of providing copolymer products, both because of process efficiencies and feedstock cost differences. Thus useful TPE polymers from olefinically unsaturated monomers, such as ethylene and $C_3$–$C_8$ α-olefins, have been developed and are also well-known. Examples include the physical blends of thermoplastic olefins ("TPO") such as polypropylene with ethylene-propylene copolymers, and similar blends wherein the ethylene-propylene, or ethylene-propylene-diolefin phase is dynamically vulcanized so as to maintain well dispersed, discrete soft phase particles in a polypropylene matrix. See, N. R. Legge, "Thermoplastic elastomer categories: a comparison of physical properties", ELASTOMERICS, pages 14–20 (September, 1991), and references cited therein.

The use of metallocene catalysts for olefin polymerization has led to additional contributions to the field. U.S. Pat. No. 5,391,629 describes thermoplastic elastomer compounds comprising tapered and block linear polymers from ethylene and alpha-olefin monomers. Polymers having hard and soft segments are said to be possible with single site metallocene catalysts that are capable of preparing both segments. Examples are provided of linear thermoplastic elastomers having hard blocks of high density polyethylene or isotactic polypropylene and soft blocks of ethylene-propylene rubber. Japanese Early Publication H4-337308(1992) describes what is said to be a polyolefin copolymer product made by polymerizing propylene first so as to form an isotactic polypropylene and then copolymerizing the polypropylene with ethylene and propylene, both polymerizations in the presence of an organoaluminum compound and a silicon-bridged, biscyclopentadienyl zirconium dihalide compound.

Datta, et al (D. J. Lohse, S. Datta, and E. N. Kresge, Macromolecules 24, 561 (1991) described EP backbones functionalized with cyclic diolefins by terpolymerization of ethylene, propylene and diolefin. The statistically functionalized EP "soft block" was then copolymerized with propylene in the presence of a catalyst producing isotactic polypropylene. In this way, some of the "hard" block polypropylene chains were grafted through the residual olefinic unsaturation onto the EP "soft" block as they were formed. See also, EP-A-0 366 411. A limitation of this class of reactions, in which chains with multiple functionalities are used in subsequent reactions, is the formation of undesirable high molecular weight material typically referred to as gel in the art. U.S. Pat. No. 4,999,403 describes similar graft copolymer compounds where functional groups in the EPR backbone are used for grafting isotactic polypropylene having reactive groups. In both the graft copolymers are said to be useful as compatibilizer compounds for blends of isotactic polypropylene and ethylene-propylene rubber.

SUMMARY OF THE INVENTION

The invention relates to a thermoplastic elastomer composition comprising a branched olefin copolymer derived from olefinically unsaturated monomers capable of insertion polymerization having A) a $T_g$ as measured by DSC less than or equal to 10° C.; B) a melt temperature ($T_m$) greater than 80° C.; C) an elongation at break of greater than or equal to 300%, preferably greater than 500%; D) a Tensile Strength of greater than or equal to 1,500 psi (10,300 kPa), preferably greater than 2,000 psi (13,800 kPa); and E) an elastic recovery of greater than or equal to 50%. More particularly, the branched olefin copolymer is one that comprises crystallizable sidechains derived from olefins, optionally with one or more copolymerizable monomers, such that the $T_m$ is greater than 80° C., and the number-average molecular weight ($M_n$) is greater than 1,500 and less than 45,000. The invention thermoplastic elastomer composition can be prepared by the process comprising: A) copolymerizing an olefin, optionally with one or more copolymerizable monomers, in a polymerization reaction under conditions sufficient to form crystallizable or glassy copolymer having greater than 40% chain end-group unsaturation; B) copolymerizing the product of A) with ethylene and one or more copolymerizable monomers so as to prepare said branched olefin copolymer. This thermoplastic elastomer composition exhibits elastic properties comparable or superior to those of the traditionally important SBC copolymers thus providing alternative means of feedstock sourcing and industrial production for this important class of commercial products.

BRIEF DESCRIPTION OF FIGURES

FIG. 1 illustrates a comparison of measured physical properties of branched olefin copolymers of the invention with a commercially available styrene block copolymer thermoplastic elastomer.

DETAILED DESCRIPTION OF THE INVENTION

The thermoplastic elastomer compositions of this invention are comprised of branched copolymers wherein both the copolymer backbone and polymeric sidechains are derived from monoolefins polymerized under coordination or insertion conditions with activated transition metal organometallic catalyst compounds. The sidechains are copolymerized so as to exhibit crystalline, semi-crystalline, or glassy properties suitable for hard phase domains in accordance with the art understood meaning of those terms, and are attached to a polymeric backbone that is less crystalline or glassy than the sidechains, preferably, substantially amorphous, so as to be suitable for the complementary soft phase domains characteristic of thermoplastic elastomer compositions.

The crystallizable sidechains are comprised of chemical units capable of forming crystalline or glassy polymeric segments under conditions of insertion polymerization. Known monomers meeting this criteria are ethylene, propylene, 3-methyl-1-pentene, and copolymers thereof, including ethylene copolymers with α-olefin, cyclic olefin or styrenic comonomers. Ethylene or propylene copolymer sidechains are preferable provided that the amount of comonomer is insufficient to disrupt the crystallinity such that the $T_m$ is reduced below 80° C. Suitable comonomers include $C_3$–$C_{20}$ α-olefins or geminally disubstituted monomers, $C_5$–$C_{25}$ cyclic olefins, styrenic olefins and lower carbon number ($C_3$–$C_8$) alkyl-substituted analogs of the cyclic and styrenic olefins. Thus, typically, the sidechains can comprise from 85–100 mol % ethylene, and from 0–15 mol % comonomer, preferably 90–99 mol % ethylene and 1–10 mol % comonomer, most preferably 94–98 mol % ethylene and 2–6 mol % comonomer. Alternatively, the sidechains can comprise from 90–100 mol % propylene, and from 0–10 mol % comonomer, preferably 92–99 mol % propylene and 1–8 mol % comonomer, most preferably 95–98 mol % propylene and 2–5 mol % comonomer. In particular, as the sidechain $M_n$ increases above about 3,000, it is preferable to introduce small amounts of comonomer to minimize embrittlement, e.g., about 0.2–4.0 mol.% comonomer. The selection of comonomer can be based upon properties other than crystallinity disrupting capability, for instance, a longer olefin comonomer, such as 1-octene, may be preferred over a shorter olefin such as 1-butene for improved polyethylene film tear. For improved polyethylene film elasticity or barrier properties, a cyclic comonomer such as norbornene or alkyl-substituted norbornene may be preferred over an α-olefin.

The sidechains can have narrow or broad molecular weight distribution ($M_w/M_n$), for example, from 1.1 to 30, typically 2–8. Additionally, the sidechains can have different comonomer compositions, e.g., including the orthogonal compositional distributions described in U.S. Pat. No. 5,382,630 (CDBI>50%), incorporated by reference for purposes of U.S. patent practice. Optionally, mixtures of sidechains with different molecular weights and/or compositions may be used.

The $M_n$ of the sidechains are within the range of from greater than or equal to 1,500 and less than or equal to 45,000. Preferably the $M_n$ of the sidechains is from 1,500 to 30,000, and more preferably the $M_n$ is from 1,500 to 25,000. The number of sidechains is related to the $M_n$ of the sidechains such that the total weight ratio of the weight of the sidechains to the total weight of the polymeric backbone segments between and outside the incorporated sidechains is less than 60%, preferably 40–50%. Molecular weight here is determined by gel permeation chromatography (GPC) and differential refractive index (DRI) measurements. A preferred branched olefinic copolymer within this class will have an enthalpy of fusion ($\Delta H_f$) as measured by differential scanning calorimetry of $\leq 90$ cal/g (measured by integrating heat flows recorded at temperatures $\geq 80°$ C. while scanning at $\geq 5°$ C./min).

The backbone, or backbone polymeric segments, when taken together with the sidechain interruption of the backbone structure, should have a lower $T_m$ (or $T_g$ if not exhibiting a $T_m$) than the sidechains. Thus it will preferably comprise segments of chemical units not having a measurable crystallinity, or having a $T_g$ lower than −10° C. The backbone segments as taken together typically will have a $T_m$ less than or equal to 80° C. and a $T_g$ less than or equal to −10° C. Elastomeric backbones will be particularly suitable, such will be typically comprised of ethylene and one or more of $C_3$–$C_{12}$ α-olefins or diolefins, particularly propylene and 1-butene. Other copolymerizable monomers include generally disubstituted olefins such as isobutylene, cyclic olefins such as cyclopentene, norbornene and alkyl-substituted norbornenes, and styrenic monomers such as styrene and alkyl substituted styrenes. Low crystallinity backbones are suitable, examples are high comonomer content ethylene copolymers (as described before), e.g., >than 8 mol % comonomer.

As indicated above the mass of the backbone will typically comprise at least 40 wt % of the total polymer mass, that of the backbone and the sidechains together, so the backbone typically will have a nominal weight-average molecular weight ($M_w$) weight of at least equal to or greater than about 50,000. The term nominal is used to indicate that direct measurement of $M_w$ of the backbone is largely impossible but that characterization of the copolymer product will exhibit measurements of $M_w$ that correlate to a close approximate weight of the polymeric backbone inclusive only of the monoolefin mer derivatives and the insertion moieties of the sidebranches.

The branched olefin copolymers comprising the above sidechains and backbones will typically have an $M_w$ equal to or greater than 50,000 as measured by GPC/DRI as defined for the examples. The $M_w$ typically can exceed 300,000, preferably 200,000, up to 500,000 or higher.

The thermoplastic elastomer composition of the invention can be prepared by a process comprising: A) copolymerizing ethylene or propylene, optionally with one or more copolymerizable monomers, in a polymerization reaction under conditions sufficient to form a copolymer having greater than 40% chain end-group unsaturation, a $T_m \geq 80°$ C. and a $T_g \leq 10°$ C.; B) copolymerizing the product of A) with ethylene and one or more copolymerizable monomers so as to prepare said branched olefin copolymer. For enthylene-based macromers prepared in step A), the $T_g$ is preferably less than −5° C., more preferably less than −10° C.

The process step A) can be usefully practiced in a solution process in which ethylene and, optionally, one or more copolymerizable monomers, is contacted with a transition metal olefin polymerization catalyst activated by an alkylalumoxane cocatalyst, the mole ratio of aluminum to transition metal being less than about 220:1. The terminally unsaturated copolymer population so formed, with or without separation from copolymer product having only saturated ends, can then be copolymerized with ethylene and copolymerizable monomers in a separate reaction by solution, slurry or gas phase ethylene polymerization with an activated transition metal insertion polymerization catalyst, particularly a catalyst capable of incorporating the ethylene copolymers into said branched olefin copolymer.

Alternatively, the process step A) can be practiced in a solution process in which propylene and, optionally, one or more copolymerizable monomers, is contacted with a stereorigid transition metal olefin polymerization catalyst, one capable of producing stereregular polypropylene, activated by any suitable cocatalyst, the reaction temperature kept at sufficiently high levels so as to achieve significant populations of terminally unsaturated polymer chains, e.g., greater than about 85° C., preferably greater than about 90° C. The terminally unsaturated copolymer population so formed, with or without separation from copolymer product having only saturated ends, can then be copolymerized with ethylene and copolymerizable monomers, or other selection of monomers suitable for the preparation of low crystallinity polymers, in a separate reaction by solution, slurry or gas phase ethylene polymerization with an activated transition metal insertion polymerization catalyst, particularly a catalyst capable of incorporating the propylene copolymers into said branched olefin copolymer having the low crystallinity backbone.

Conditions sufficient to form the sidechain ethylene copolymer include using suitable ethylene and comonomer reactant ratios to assure the described sidechain olefin-derived unit constitution, plus catalyst and process conditions conducive to forming the unsaturated chain ends. The teachings of copending provisional application U.S. Ser. No. 60/037323 filed Feb. 7, 1997 are specific to suitable catalyst selection and use to prepare macromeric copolymer chains with a high yield of vinyl unsaturation. The metallocene catalyst used in the step A) preparation of the unsaturation-containing macromer can be essentially any catalyst capable of insertion polymerization of ethylene, it can be one capable of high comonomer incorporation capability (see below) or of low comonomer incorporation capability. Those of low incorporation capability are typically those that are more congested at the metal coordination site, thus unbridged and substituted unbridged metallocene catalysts are particularly suitable. See also the teachings of U.S. Pat. No. 5,498,809 and international publications WO 94/19436 and WO 94/13715, describing means of preparing vinylidene-terminated ethylene-1-butene copolymers in high yields. See also, the teachings of copending application U.S. Ser. No. 08/651,030, filed May 21, 1996, U.S. Pat. No. 5,763,556 as to the preparation of ethylene-isobutylene copolymers having high levels of vinylidene chain-end unsaturation. Throughout the description above, and below, the phrase "chain-end" or "terminal" when referring to unsaturation means olefin unsaturation suitable for insertion polymerization whether or not located precisely at the terminus of a chain. See also U.S. Pat. Nos. 5,324,801 and 5,621,054 addressing alternating ethylene-cyclic olefin copolymers having crystalline melting points of 235° C., and up, macromers produced with the suitable catalysts of these descriptions will have glassy attributes effective for functioning as the hard phase component of the thermoplastic elastomers of this invention. All documents of this paragraph are incorporated by reference for purposes of U.S. patent practice.

In a particular embodiment, polymeric vinyl-containing, ethylene-containing macromer product, suitable as branches for a subsequent copolymerization reaction, can be prepared under solution polymerization conditions with preferred molar ratios of aluminum in the alkyl alumoxane activator, e.g., methyl alumoxane (MAO), to transition metal. Preferably that level is $\geq 20$ and $\leq 175$; more preferably $\geq 20$ and $\leq 140$; and, most preferably $\geq 20$ and $\leq 100$. The temperature, pressure and time of reaction depend upon the selected process but are generally within the normal ranges for a solution process. Thus temperatures can range from 20° C. to 200° C., preferably from 30° C. to 150° C., and more preferably from 50° C. to 140° C. The pressures of the reaction generally can vary from atmospheric to 345 MPa, preferably to 182 MPa. For typical solution reactions, temperatures will typically range from ambient to 190° C. with pressures from ambient to 3.45 MPa. The reactions can be run batchwise. Conditions for suitable slurry-type reactions are similar to solution conditions except reaction temperatures are limited to those below the melt temperature of the polymer. In an additional, alternative reaction configuration, a supercritical fluid medium can be used with temperatures up to 250° C. and pressures up to 345 MPa. Under high temperature and pressure reaction conditions, macromer product of lower molecular weight ranges are typically produced, e.g., $M_n$ about 1,500.

In an alternative embodiment, polymeric vinyl-containing, propylene-containing macromer product, suitable as branches for a subsequent copolymerization reaction, can be prepared under solution polymerization conditions with metallocene catalysts suitable for preparing either of isotactic or syndiotactic polypropylene. A preferred reaction process for propylene macromers having high levels of terminal vinyl unsaturation is described in co-pending U.S. application 60/067,783, filed Dec. 10, 1997, Attorney Docket No. 97B075. Typically used catalysts are stereorigid, chiral or asymmetric, bridged metallocenes. See, for example, U.S. Pat. No. 4,892,851, U.S. Pat. No. 5,017,714, U.S. Pat. No. 5,132,281, U.S. Pat. No. 5,155,080, U.S. Pat. No. 5,296,434, U.S. Pat. No. 5,278,264, U.S. Pat. No. 5,318,935, WO-A-(PCT/US92/10066), WO-A-93/19103, EP-A2-0 577 581, EP-A1-0 578 838, and academic literature "The Influence of Aromatic Substituents on the Polymerization Behavior of Bridged Zirconocene Catalysts", Spaleck, W., et al, *Organometallics* 1994, 13, 954–963, and "ansa-Zirconocene Polymerization Catalysts with Annelated Ring Ligands-Effects on Catalytic Activity and Polymer Chain Lengths", Brinzinger, H., et al, *Organometallics* 1994, 13, 964–970, and documents referred to therein.

Preferably, for isotactic polypropylene, the stereorigid transition metal catalyst compound is selected from the group consisting of bridged bis(indenyl) zirconocenes or hafnocenes. In a preferred embodiment, the transition metal catalyst compound is a dimethylsilyl-bridged bis(indenyl) zirconocene or hafnocene. More preferably, the transition metal catalyst compound is dimethylsilyl (2-methyl-4-phenylindenyl) zirconium or hafnium dichloride or dimethyl. In another preferred embodiment, the transition metal catalyst is a dimethylsilyl-bridged bis(indenyl) hafnocene such as dimethylsilyl bis(indenyl)hafnium dimethyl or dichloride. The method for preparing propylene-based macromers having a high percentage of vinyl terminal bonds involves:

a) contacting, in solution, propylene, optionally a minor amount of copolymerizable monomer, with a catalyst composition containing the stereorigid, activated transition metal catalyst compound at a temperature from about 90° C. to about 120° C.; and b) recovering isotactic or syndiotactic polypropylene chains having number average molecular weights of about 2,000 to about 50,000 Daltons.

Preferably, the solution comprises a hydrocarbon solvent. More preferably, the hydrocarbon solvent is aromatic. Also, the propylene monomers are preferably contacted at a temperature from 95° C. to 115° C. More preferably, a temperature from 100° C. to 110° C. is used. Most preferably, the propylene monomers are contacted at a temperature from 105° C. to 110° C. The pressures of the reaction generally can vary from atmospheric to 345 MPa, preferably to 182 MPa. The reactions can be run batchwise or continuously. Conditions for suitable slurry-type reactions will also be suitable and are similar to solution conditions, the polymerization typically being run in liquid propylene under pressures suitable to such. All documents are incorporated by reference for purposes of U.S. Patent practice.

Additionally the invention branched olefin copolymer thermoplastic elastomer composition can be prepared directly from the selected olefins concurrently in the presence of a mixed catalyst system comprising at least one first transition metal olefin polymerization catalyst capable of preparing ethylene or propylene copolymers having greater than 40% chain end-group unsaturation and at least one second transition metal olefin polymerization catalyst capable of incorporating the ethylene or propylene homopolymer or copolymer sidechains into said branched olefin copolymer. This in situ method can be practiced by any method that permits both preparation of unsaturated macromers having crystalline, semi-crystalline or glassy properties and copolymerization of the macromers with comonomers constituting the low crystallinity backbone such that the branched copolymer is prepared. Gas phase, slurry and solution processes can be used under conditions of temperature and pressure known to be useful in such processes.

Suitable first catalyst compounds that when activated can achieve high chain-end unsaturations specifically include those identified above with respect to the preparation of high vinyl or vinylidene-containing macromers. Preferably, catalysts that are active for ethylene homopolymerization but do not incorporate higher carbon number monomers appreciably, as discussed above, or do so only with attendant decrease in $M_n$, will be particularly suitable for the crystalline or glassy sidechain preparation in the concurrent, or in situ, method of preparing the invention thermoplastic copolymer compositions of the invention, so long as the $M_n$ can be raised or maintained above the sidechain minimum.

Suitable second catalyst compounds include those that are capable of good comonomer incorporation without significant depression in $M_n$, for the polymeric backbone under the temperature and pressure conditions used. The teachings of copending provisional application U.S. Ser. No. 60/037323 filed Feb. 7, 1997 are specific to suitable catalyst selection and use to prepare branched olefin copolymers and addresses catalyst compounds suitable for high comonomer and macromonomer incorporation. As indicated therein, preferred catalyst compounds for assembling the branch olefin copolymers from vinyl- or vinylidene containing macromers, ethylene and copolymerizable comonomers include the bridged biscyclopentadienyl and monocyclopentadienyl Group 4 metal compounds of U.S. Pat. Nos. 5,198,401, 5,270,393, 5,324,801, 5,444,145, 5,475,075, 5,635,573, International applications WO 92/00333 and WO 96/00244; see also the unbridged monocyclopentadienyl Group 4 metal compounds of copending application Ser. No. 08/545,973, filed Oct. 20, 1995, ABN and the bis-amido and bis-arylamido transition metal catalysts of U.S. Pat. No. 5,318,935 and copending U.S. patent application Ser. No. 08/803,687, filed Feb. 24, 1997, and the α-diimine nickel catalyst complexes of WO 96/23010. In accordance with these teachings, the transition metal catalyst compounds are typically used with activating co-catalyst components as described, e.g., alkyl alumoxanes and ionizing compounds capable of providing a stabilizing non-coordinating anion. The teachings of each of the documents of this paragraph are also incorporated by reference for purposes of U.S. patent practice.

Industrial Applicability

The thermoplastic elastomer compositions according to the invention will have use in a variety of applications wherein other thermoplastic elastomer compositions have found use. Such uses include, but are not limited to, those known for the styrene block copolymers, e.g., styrene-isoprene-styrene and styrene-butadiene-styrene copolymers, and their hydrogenated analogs. Such include a variety of uses such as backbone polymers in adhesive compositions and molded articles. These applications will benefit from the increased use temperature range, typically exceeding the 80–90° C. limitation of the SBC copolymer compositions. The compositions of the invention will also be suitable as compatibilizer compounds for polyolefin blends. Additionally, due to the inherent tensile strength, elasticity, and ease of melt processing, extruded film, coating and packaging compositions can be prepared comprising the invention thermoplastic elastomer compositions, optionally as modified with conventional additives and adjuvents. Further, in view of the preferred process of preparation using insertion polymerization of readily available olefins, the invention thermoplastic elastomer compositions can be prepared with low cost petrochemical feedstock under low energy input conditions (as compared to either of low temperature anionic polymerization or multistep melt processing conditions where vulcanization is needed to achieve discrete thermoplastic elastomer morphologies).

EXAMPLES

In order to illustrate the present invention, the following examples are provided. Such are not meant to limit the invention in any respect, but are solely provided for illustration purposes.

General: All polymerizations were performed in a 1-liter Zipperclave reactor equipped with a water jacket for temperature control. Liquids were measured into the reactor using calibrated sight glasses. High purity (>99.5%) hexane, toluene and butene feeds were purified by passing first through basic alumina activated at high temperature in nitrogen, followed by 13×molecular sieve activated at high temperature in nitrogen. Polymerization grade ethylene was supplied directly in a nitrogen-jacketed line and used without further purification. Clear, 10% methylalumoxane (MAO) in toluene was received from Albemarle Inc. in stainless steel cylinders, divided into 1-liter glass containers, and stored in a laboratory glove-box at ambient temperature. Ethylene was added to the reactor as needed to maintain total system pressure at the reported levels (semi-batch operation). Ethylene flow rate was monitored using a Matheson mass flow meter (model number 8272-0424). To ensure the reaction medium was well-mixed, a flat-paddle stirrer rotating at 750 rpm was used.

Reactor preparation: The reactor was first cleaned by heating to 150° C. in toluene to dissolve any polymer residues, then cooled and drained. Next, the reactor was heated using jacket water at 110° C. and the reactor was purged with flowing nitrogen for a period of ~30 minutes. Before reaction, the reactor was further purged using 10 nitrogen pressurize/vent cycles (to 100 psi) and 2 ethylene pressurize/vent cycles (to 300 psi). The cycling served three purposes: (1) to thoroughly penetrate all dead ends such as pressure gauges to purge fugitive contaminants, (2) to displace nitrogen in the system with ethylene, and (3) to pressure test the reactor.

Catalyst preparation: All catalyst preparations were performed in an inert atmosphere with <1.5 ppm $H_2O$ content. In order to accurately measure small amounts of catalyst, often less than a milligram, freshly prepared catalyst stock solution/dilution methods were used in catalyst preparation. To maximize solubility of the metallocenes, toluene was used as a solvent. Stainless steel transfer tubes were washed with MAO to remove impurities, drained, and activator and catalyst were added by pipette, MAO first.

Macromer synthesis: First, the catalyst transfer tube was attached to a reactor port under a continuous flow of nitrogen to purge ambient air. Next, the reactor was purged and pressure tested as outlined above. Then, 600 ml of solvent was charged to the reactor and heated to the desired temperature. Comonomer (if any) was then added, temperature was allowed to equilibrate, and the base system pressure was recorded. The desired partial pressure of ethylene was added on top of the base system pressure. After allowing the ethylene to saturate the system (as indicated by zero ethylene flow), the catalyst was injected in a pulse using high pressure solvent. Reaction progression was monitored by reading ethylene uptake from the electronic mass flow meter. When the desired amount of macromer had accumulated, ethylene flow was terminated and the reaction was terminated by heating (~1 minute) to 150° C. for 30 minutes. At the end of the kill step, the reactor was cooled to the temperature desired for the LCB block assembly reaction (below) and a macromer sample was removed for analysis.

Assembly of LCB Block Structures. All long chain branched (LCB) olefin copolymer assembly reactions were performed in toluene using ethylene at 100 psi and MAO-activated $(C_5Me_4SiMe_2NC_{12}H_{23})TiCl_2$ catalyst. Butene was used as comonomer in most syntheses, but select reactions were performed using norbornene comonomer in order to generate samples used to quantify LCB content. Reaction was terminated by methanol injection when the desired amount of polymer (total accumulated mass) were produced. Ethylene uptake/reactor pressure drop was observed to halt within about 10 seconds of injection. The product was poured into an excess of isopropyl alcohol and evaporated to dryness. In another example (Example 3), $Cp_2ZrCl_2$ and $(C_5Me_4SiMe_2NC_{12}H_{23})TiCl_2$ catalysts were used in single-step, mixed metallocene syntheses where the macromers were prepared concurrently with the backbone and incorporated therein.

Catalyst pairing. For the mixed metallocene in situ example, the metallocene catalyst pair was selected such that both a good incorporating catalyst and a poorer incorporating catalyst was used. For this technology, the good incorporator will typically exhibit three times the incorporation capability of the poor incorporator or, even more preferably, five times the incorporation capability. Comonomer incorporation capability is defined and measured for each catalyst compound, for the purposes of the present invention, in terms of weight percent butene incorporation using a defined standard reaction condition as follows. A one liter autoclave reactor is purged 2 hours at 90° C. with high purity nitrogen. The system is next purged of nitrogen using flowing ethylene. Next, 600 milliliters of toluene and 50 milliliters of liquid butene are added. The system is allowed to equilibrate at 90° C. Next, ethylene at 100 psig is added until the solution is saturated. A milligram of catalyst is added to 0.5 milliliters of 10 weight percent MAO in a stainless steel addition tube in an inert atmosphere glovebox. Depending on the reactivity of the catalyst, more or less catalyst/MAO solution may be required to assure substantial levels of polymerization without excessive reaction exotherms. The catalyst is injected into the reactor using pressurized solvent. Reactor pressure is maintained at 100 psig throughout reaction by adding ethylene as required. The reaction is terminated before the reactant compositions inside the reactor change substantially (<20% conversion, as determined by analysis of the reaction product). Comonomer incorporation is measured by $^1H$ NMR and is reported as ethyl groups per 1000 carbon atoms.

Example 1

Catalyst Preparation. A stainless steel catalyst addition tube was prepared as outlined above. An aliquot of 1 milliliter of 10% methylalumoxane (MAO) solution in toluene was added, followed by 5 milliliters of a toluene solution containing 16 milligrams of $(C_5Me_4SiMe_2NC_{12}H_{23})TiCl_2$. The sealed tube was removed from the glovebox and connected to a reactor port under a continuous flow of nitrogen. A flexible, stainless steel line from the reactor supply manifold was connected to the other end of the addition tube under a continuous flow of nitrogen.

Macromer Synthesis. The reactor was simultaneously purged of nitrogen and pressure tested using two ethylene fill/purge cycles (to 300 psig). Then, the reactor pressure was raised to ~40 psi to maintain positive reactor pressure during setup operations. Jacket water temperature was set to 90° C. and 600 milliliters of toluene and 10 milliliters of butene were added to the reactor. The stirrer was set to 750 rpm. Additional ethylene was added to maintain a positive reactor gauge pressure as gas phase ethylene was absorbed into solution. The reactor temperature controller was set to 90° C. and the system was allowed to reach steady state. The ethylene pressure regulator was next set to 100 psig and ethylene was added to the system until a steady state was achieved as measured by zero ethylene uptake. The reactor was isolated and a pulse of toluene pressurized to 300 psig was used to force the catalyst solution from the addition tube into the reactor. The 100 psig ethylene supply manifold was immediately opened to the reactor in order to maintain a constant reactor pressure as ethylene was consumed by reaction.

After 15 minutes of reaction, the reaction solution was quickly heated to 150° C. for 30 minutes, then cooled to 90° C. A sample of the prepolymerized macromer was removed from the reactor.

LCB Block Copolymer Synthesis. A stainless steel catalyst addition tube was prepared as outlined above. An aliquot of 0.5 milliliter of 10% methylalumoxane (MAO) solution in toluene was added to the tube, followed by 1 milliliter of a toluene solution containing 0.5 milligrams of $(C_5Me_4SiMe_2NC_{12}H_{23})TiCl_2$ per milliliter. The sealed tube was removed from the glovebox and connected to a reactor port under a continuous flow of nitrogen. A flexible, stainless steel line from the reactor supply manifold was connected to the other end of the addition tube under a continuous flow of nitrogen.

The reactor temperature controller was set to 90° C. Next, 70 milliliters of butene were added to the macromer-containing reactor and the system was allowed to reach thermal equilibrium. Ethylene was next added to the system at 100 psig (total). After allowing the ethylene to saturate the system (as indicated by zero ethylene flow), the catalyst was injected in a pulse using high pressure solvent. Reaction progression was monitored by reading ethylene uptake from the electronic mass flow meter. Reaction was terminated by methanol injection after 15 minutes. The product was poured into an excess of isopropyl alcohol and evaporated to dryness. Total yield of LCB block copolymer was 42.6 grams.

Example 2

Catalyst Preparation. A stainless steel catalyst addition tube was prepared as outlined above. An aliquot of 0.5 milliliter of 10% methylalumoxane (MAO) solution in toluene was added, followed by 5 milliliters of a toluene solution containing 8 milligrams of $Cp_2ZrCl_2$. The sealed tube was removed from the glovebox and connected to a reactor port under a continuous flow of nitrogen. A flexible, stainless steel line from the reactor supply manifold was connected to the other end of the addition tube under a continuous flow of nitrogen.

Macromer Synthesis. The reactor was simultaneously purged of nitrogen and pressure tested using two ethylene fill/purge cycles (to 300 psig). Then, the reactor pressure was raised to ~20 psi to maintain positive reactor pressure during setup operations. Jacket water temperature was set to 90° C. and 600 milliliters of toluene and 2 milliliters of 80.6 weight percent norbornene in toluene were added to the reactor. The stirrer was set to 750 rpm. Additional ethylene was added to maintain a positive reactor gauge pressure as gas phase ethylene was absorbed into solution. The reactor temperature controller was set to 90° C. and the system was allowed to reach steady state. The ethylene pressure regulator was next set to 30 psig and ethylene was added to the system until a steady state was achieved as measured by zero ethylene uptake. The reactor was isolated and a pulse of toluene pressurized to 300 psig was used to force the catalyst solution from the addition tube into the reactor. The 30 psig ethylene supply manifold was immediately opened to the reactor in order to maintain a constant reactor pressure as ethylene was consumed by reaction.

After 15 minutes of reaction, the reaction solution was quickly heated to 150° C. for 30 minutes, then cooled to 90° C. A sample of the prepolymerized macromer was removed from the reactor.

LCB Block Copolymer Synthesis. A stainless steel catalyst addition tube was prepared as outlined above. An aliquot of 0.5 milliliter of 10% methylalumoxane (MAO) solution in toluene was added, followed by 1 milliliter of a toluene solution containing 1 milligram of $(C_5Me_4SiMe_2NC_{12}H_{23})TiCl_2$ per milliliter. The sealed tube was removed from the glovebox and connected to a reactor port under a continuous flow of nitrogen. A flexible, stainless steel line from the reactor supply manifold was connected to the other end of the addition tube under a continuous flow of nitrogen.

The reactor temperature controller was set to 60° C. Next, 60 milliliters of 80.6% norbornene in toluene were added and the system was allowed to reach thermal equilibrium. Ethylene was next added to the system at 100 psig (total). After allowing the ethylene to saturate the system (as indicated by zero ethylene flow), the catalyst was injected in a pulse using high pressure solvent. Reaction progression was monitored by reading ethylene uptake from the electronic mass flow meter. Reaction was terminated by methanol injection after 5 minutes. The product was poured into an excess of isopropyl alcohol and evaporated to dryness. Total yield of LCB block copolymer was 91.9 grams.

Example 3

Catalyst Preparation. A stainless steel catalyst addition tube was prepared as outlined above. An aliquot of 1 milliliter of 10% methylalumoxane (MAO) solution in toluene was added, followed by a toluene solution containing 0.25 milligrams of $(C_5Me_4SiMe_2NC_{12}H_{23})TiCl_2$ and 5 micrograms of $Cp_2ZrCl_2$. The sealed tube was removed from the glovebox and connected to a reactor port under a continuous flow of nitrogen. A flexible, stainless steel line from the reactor supply manifold was connected to the other end of the addition tube under a continuous flow of nitrogen.

In situ LCB Block Copolymer Synthesis. The reactor was simultaneously purged of nitrogen and pressure tested using two ethylene fill/purge cycles (to 300 psig). Then, the reactor pressure was raised to ~40 psi to maintain positive reactor pressure during setup operations. Jacket water temperature was set to 90° C. and 600 milliliters of toluene and 20 milliliters of butene were added to the reactor. The stirrer was set to 750 rpm. Additional ethylene was added to maintain a positive reactor gauge pressure as gas phase ethylene was absorbed into solution. The reactor temperature controller was set to 90° C. and the system was allowed to reach steady state. The ethylene pressure regulator was next set to 100 psig and ethylene was added to the system until a steady state was achieved as measured by zero ethylene uptake. The reactor was isolated and a pulse of toluene pressurized to 300 psig was used to force the catalyst solution from the addition tube into the reactor. The 100 psig ethylene supply manifold was immediately opened to the reactor in order to maintain a constant reactor pressure as ethylene was consumed by reaction. Reaction was terminated by methanol injection after 7 minutes. The product was poured into an excess of isopropyl alcohol and evaporated to dryness. Total yield of LCB block copolymer was 18.5 grams.

Properties

Structural data for the select materials are listed in Table 1. In the case of the first two elastomeric examples (1 and 2), the macromer was sampled directly from the reactor and characterized by $^1$H-NMR and GPC, while for example 3 (mixed metallocene synthesis), the properties of the macromer and backbone were attributed from the corresponding single metallocene reactions.

Tensile data were obtained at room temperature and 80° C. according to method ASTM D-412 (in FIG. 1, tensile strength at break at room temperature and 80° C. is reported in units of pounds per square inch while elongation at break is reported as a percentage). Recovery was measured at room temperature using sample specimens identical to those used in ASTM D-412 test except the sample was stretched 150%, then released for 10 minutes and the percent recovery to the original dimensions measured directly using reference marks on the test sample. Tensile data for select samples indicate the statistically branched LCB block copolymer formulations exhibited tensile strengths which were equal to or exceeded styrenic block copolymers (Kraton®), with elastic recovery slightly defensive relative to Kraton®, but well within commercially useful limits (see Table 1 and FIG. 1). Tensile strength at break is highest for the norbornene LCB block copolymer (4,011 psi) whereas the best elastic recovery (89%) was observed in a mixed-metallocene butene LCB block copolymer. Both the low molecular weight (10K, $Cp_2ZrCl_2$ catalyzed) and high $M_n$ (30–40K, $(C_5Me_4SiMe_2NC_{12}H_{23})TiCl_2$-catalyzed) macromer gave LCB block copolymers with useful properties.

The ethylene/butene LCB block copolymers exhibit elastomeric properties superior to an EXACT® 4033 (Exxon Chemical Company) ethylene/butene (E/B) random copolymer of similar density and equal or better to an ENGAGE® 8100 (Dow Chemical Company) ethylene/octene (E/O) random copolymer of similar density (Table 2). Comparison of the ethylene/norbornene (E/NB) linear and E/NB LCB block counterparts indicate the LCB block copolymer is somewhat defensive in most areas, due in part to its much lower norbornene content. Of course, all of the LCB block copolymers melt at much higher temperatures than their linear counterparts, due to the crystallizable, low molecular weight branch component. It is interesting to note that the LCB block copolymers retain significant tensile strength even when heated above the melt temperature of their amorphous component (see 80° C. tensile data). The observed high temperature strength may be due to multi-block-type networks in which amorphous material is anchored to high density, high melting zones by side chains.

Product characterization: The branched olefin copolymer product samples were analyzed by GPC using a Waters 150C high temperature system equipped with a DRI Detector, Shodex AT-806MS column and operating at a system temperature of 145° C. The solvent used was 1,2,4 trichlorobenzene, from which polymer sample solutions of 0.1 mg/ml concentration were prepared for injection. The total solvent flow rate was 1.0 ml/minute and the injection size was 300 microliters. GPC columns were calibrated using a series of narrow polystyrenes (obtained from Tosoh Corporation, Tokyo, 1989). For quality control, a broad standard calibration based on the linear PE sample NBS-1475 was used. The standard was run with each 16-vial carousel. It was injected twice as the first sample of each batch. After elution of the polymer samples, the resulting chromatograms were analyzed using the Waters Expert Ease program to calculate the molecular weight distribution and $M_n$, $M_w$ and $M_z$ averages.

Polymer Analyses. The molecular weight, comonomer content, and unsaturated-group structural distributions of the reaction products are reported in Table 2. Unsaturated-group concentrations (total olefins per 1,000 carbon atoms) as well as vinyl group selectivities were found to increase with decreasing aluminum: metal ratios, all other factors being equal. The reported olefin comonomer concentrations can be increased further by decreasing the concentration of ethylene in solution (by decreasing ethylene partial pressure or increasing temperature).

TABLE 2

Comparison of Branch Copolymer Properties with Representative LLDPE's.

| Property | Branch copolymer E/B (#1) | Branch copolymer E/NB (#2) | Branch copolymer E/B (#3) | ENGAGE ® 8100 E/O | EXACT ® 4033 E/B |
|---|---|---|---|---|---|
| Density (g/ml) ASTM D-1505 | 0.887 | >0.935 | .887 | 0.870 | 0.880 |
| Comonomer (mol % ¹H NMR) | 15.5 | 5.65 | 12.6 | 12.1 | 11.7 |
| Melting Point (° C., DSC) | 119.2 | 115.5 | 123.5 | 60 | 63 |
| Tensile at Break psi (kPa), ASTM D-412 | 2401 (16,500) | 4011 (27,700) | 3054 (21,000) | 1030 (7,100) | 1780 (12,300) |
| Elongation at Break (%) ASTM D-412 | 905 | 386 | 669 | 950 | 740 |
| Recovery (%) 150% extension | 76 | 60 | 87 | 76 | 50 |

Note:
E = ethylene,
B = butene,
NB = norbornene,
O = octene.

TABLE 3

Comparison of Branch Copolymer Properties with Commercial Styrene Triblock Copolymer (FIG. 1)

| Ex. # | Reactor | Tensile Strength (psi/kPa @ 25° C.) | Elongation (% @ 25° C.) | Recovery (% @ 25° C.) | Tensile Strength (psi/kPa @ 80° C.) | Elongation (% @ 80° C.) |
|---|---|---|---|---|---|---|
| 1 | Dual | 4011/ 27,000 | 594 | 60 | 1544/ 10,600 | 386 |
| 2 | Single | 3054/ 21,100 | 669 | 87 | 351/ 2,400 | 505 |
| Kraton ® G 1652 | | 4002/ 27,600 | 580 | 95 | 220/ 13,500 | 86 |

We claim:

1. A thermoplastic elastomer composition comprising a branched olefin copolymer derived from olefins capable of insertion polymerization, the copolymer having A) a $T_g$ as measured by DSC less than or equal to 10° C.; B) a $T_m$ greater than 80° C.; C) an elongation at break of greater than or equal to 300%; D) a Tensile Strength of greater than or equal to 1,500 psi (10,300 kPa) at 25° C.; and E) an elastic recovery of greater than or equal to 50%.

2. The thermoplastic elastomer composition of claim 1 wherein said branched olefin copolymer comprises sidechains derived from ethylene, optionally with one or more copolymerizable monomers, such that the $T_g$ of the sidechains is less than −10° C., the $T_m$ of the sidechains is greater than or equal to 80° C., and the number-average molecular weight is greater than 1,500 and less than 45,000.

3. The thermoplastic elastomer composition of claim 1 wherein said branched olefin copolymer comprises sidechains derived from propylene, optionally with one or more copolymerizable monomers, such that the $T_g$ of the sidechains is less than 10° C., the $T_m$ of the sidechains is greater than or equal to 110° C., and the number-average molecular weight is greater than 1,500 and less than 45,000.

4. The thermoplastic elastomer of claim 1 prepared by the process comprising: A) polymerizing ethylene or propylene, optionally with one or more copolymerizable monomers, in a polymerization reaction under conditions sufficient to form a polymer having greater than 40% chain end-group unsaturation; and B) copolymerizing the product of A) with ethylene and one or more copolymerizable monomers so as to prepare said branched olefin copolymer.

5. The thermoplastic elastomer composition of claim 4 wherein step A) is conducted by a solution process in which said ethylene and one or more copolymerizable monomers are contacted with a transition metal olefin polymerization catalyst activated by an alumoxane cocatalyst, the mole ratio of aluminum to transition metal is less than 220: 1.

6. The thermoplastic elastomer composition of claim 5 wherein step B) is conducted in a separate reaction by solution, slurry or gas phase ethylene polymerization with an activated transition metal insertion polymerization catalyst.

7. The thermoplastic elastomer composition of claim 4 wherein step A) and step B) are conducted concurrently in the presence of a mixed catalyst system comprising at least one transition metal olefin polymerization catalyst capable of preparing ethylene copolymers having greater than 40% chain end-group unsaturation and at least one transition metal olefin polymerization catalyst capable of incorporating the ethylene copolymers into said branched olefin copolymer.

* * * * *